United States Patent
Sforzin et al.

(10) Patent No.: US 12,056,061 B2
(45) Date of Patent: Aug. 6, 2024

(54) ADDRESS SCRAMBLING BY LINEAR MAPS IN GALOIS FIELDS

(71) Applicant: Micron Technology, Inc., Boise, ID (US)

(72) Inventors: Marco Sforzin, Cernusco sul Naviglio (IT); Federica Cresci, Milan (IT)

(73) Assignee: Micron Technology, Inc., Boise, ID (US)

( * ) Notice: Subject to any disclaimer, the term of this patent is extended or adjusted under 35 U.S.C. 154(b) by 148 days.

(21) Appl. No.: 17/663,121

(22) Filed: May 12, 2022

(65) Prior Publication Data
US 2023/0367721 A1 Nov. 16, 2023

(51) Int. Cl.
*G06F 12/00* (2006.01)
*G06F 12/02* (2006.01)
*G06F 12/14* (2006.01)
*G06F 17/16* (2006.01)

(52) U.S. Cl.
CPC ...... *G06F 12/1441* (2013.01); *G06F 12/0238* (2013.01); *G06F 12/1483* (2013.01); *G06F 17/16* (2013.01)

(58) Field of Classification Search
CPC ............ G06F 12/1441; G06F 12/0238; G06F 12/1483; G06F 17/16
See application file for complete search history.

(56) References Cited

U.S. PATENT DOCUMENTS

| | | | |
|---|---|---|---|
| 2016/0062910 A1* | 3/2016 | Van Dyke | G06F 12/1018 711/216 |
| 2018/0150389 A1* | 5/2018 | Bhargava | G06F 12/0238 |

* cited by examiner

*Primary Examiner* — Arvind Talukdar
(74) *Attorney, Agent, or Firm* — Holland & Hart LLP

(57) ABSTRACT

Methods, systems, and devices for address scrambling by linear maps in Galois fields are described. For instance, a device may determine a bijective matrix based on a power up condition. In some examples, the device may determine the bijective matrix based on a seed value and/or may select the matrix from among a set of bijective matrices. In some examples, the bijective matrix may have at least one column and/or one row that has at least two non-zero elements. The device may generate a first address of a first address space based on applying the matrix (e.g., each column of the matrix) to at least a portion of a second address of a second address space and may access a memory array of the device based on generating the first address.

30 Claims, 7 Drawing Sheets

ADDRESS SCRAMBLING BY LINEAR MAPS IN GALOIS FIELDS

FIELD OF TECHNOLOGY

The following relates to one or more systems for memory, including address scrambling by linear maps in Galois fields.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some examples, a device (e.g., a memory device) may scramble an address in a first address space as part of generating an address in a second address space. For instance, the device may scramble a logical address as part of generating a physical address. Scrambling the address may increase a security of the device by decreasing a likelihood that an intercepting device is able to determine the logical address to physical address mapping used by the device.

In order to scramble the address, the device may use a seed value to determine one of a set of circulant reordering matrices to apply to the address, where a circulant reordering matrix may be defined as a matrix produced by shifting a pattern of an identity matrix diagonally. The quantity of circulant reordering matrices possible for a matrix of a given size may be limited. For instance, for a matrix of size n, the quantity of circulant reordering matrices may also be equal to n. Increasing the quantity of matrices that the device may select among may increase a security of the device. For instance, the amount of time for an intercepting device to determine the correct logical address to physical address mapping may increase as the quantity of matrices that the device may select from increases.

In order to increase the quantity of matrices that the device may select among, the device may instead select from a more general set of bijective matrices. The set of bijective matrices may include at least some matrices that are not circulant reordering matrices. For instance, the set of bijective matrices may include matrices that are neither an identity matrix nor are produced by shifting the entries of an identity matrix diagonally.

Features of the disclosure are initially described in the context of systems and dies as described with reference to FIGS. 1 and 2. Features of the disclosure are described in the context of a scrambling scheme and a scrambling circuit as described with reference to FIGS. 3 and 4. These and other features of the disclosure are further illustrated by and described with reference to an apparatus diagram and flowcharts that relate to address scrambling by linear maps in Galois fields as described with reference to FIGS. 5 through 7.

Figure 1:
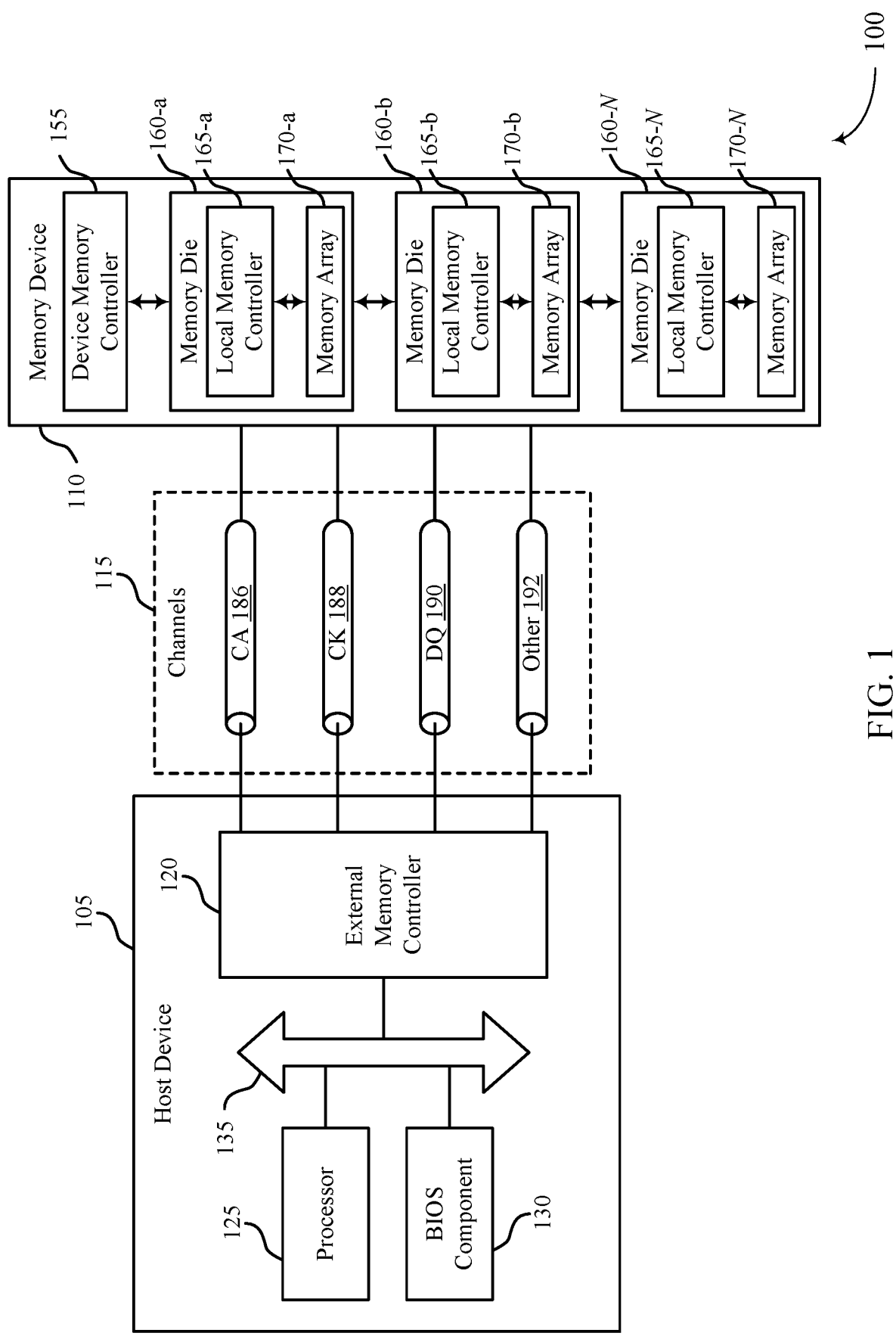
FIG. 1 illustrates an example of a system that supports address scrambling by linear maps in Galois fields in accordance with examples as disclosed herein.

FIG. 1 illustrates an example of a system 100 that supports address scrambling by linear maps in Galois fields in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. A symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some examples, a memory device 110 may scramble an address in a first address space as part of generating an address in a second address space. For instance, the memory device 110 may scramble a logical address as part of generating a physical address. Scrambling the address may increase a security of the memory device 110 by decreasing a likelihood that an intercepting memory device 110 determines the logical address to physical address mapping used by the memory device 110.

In order to scramble the address, the memory device 110 may use a seed value to determine one of a set of circulant reordering matrices to apply to the address, where a circulant reordering matrix may be defined as a matrix produced by shifting the pattern of an identity matrix diagonally. The quantity of circulant reordering matrices possible for a matrix of a given size may be limited. For instance, for a matrix of size n, the quantity of circulant reordering matrices may also be equal to n. Increasing the quantity of matrices that the memory device 110 may select among may increase a security of the memory device 110. For instance, the amount of time for an intercepting memory device 110 to determine the correct logical address to physical address mapping may increase as the quantity of matrices that the memory device 110 may select from increases.

In order to increase the quantity of matrices that the memory device 110 may select among, the memory device 110 may instead select from a set of bijective matrices. The set of bijective matrices may include matrices that are not circulant reordering matrices. For instance, the set of bijective matrices may include at least some matrices that are neither an identity matrix nor are produced by shifting an identity matrix diagonally.

Figure 2:
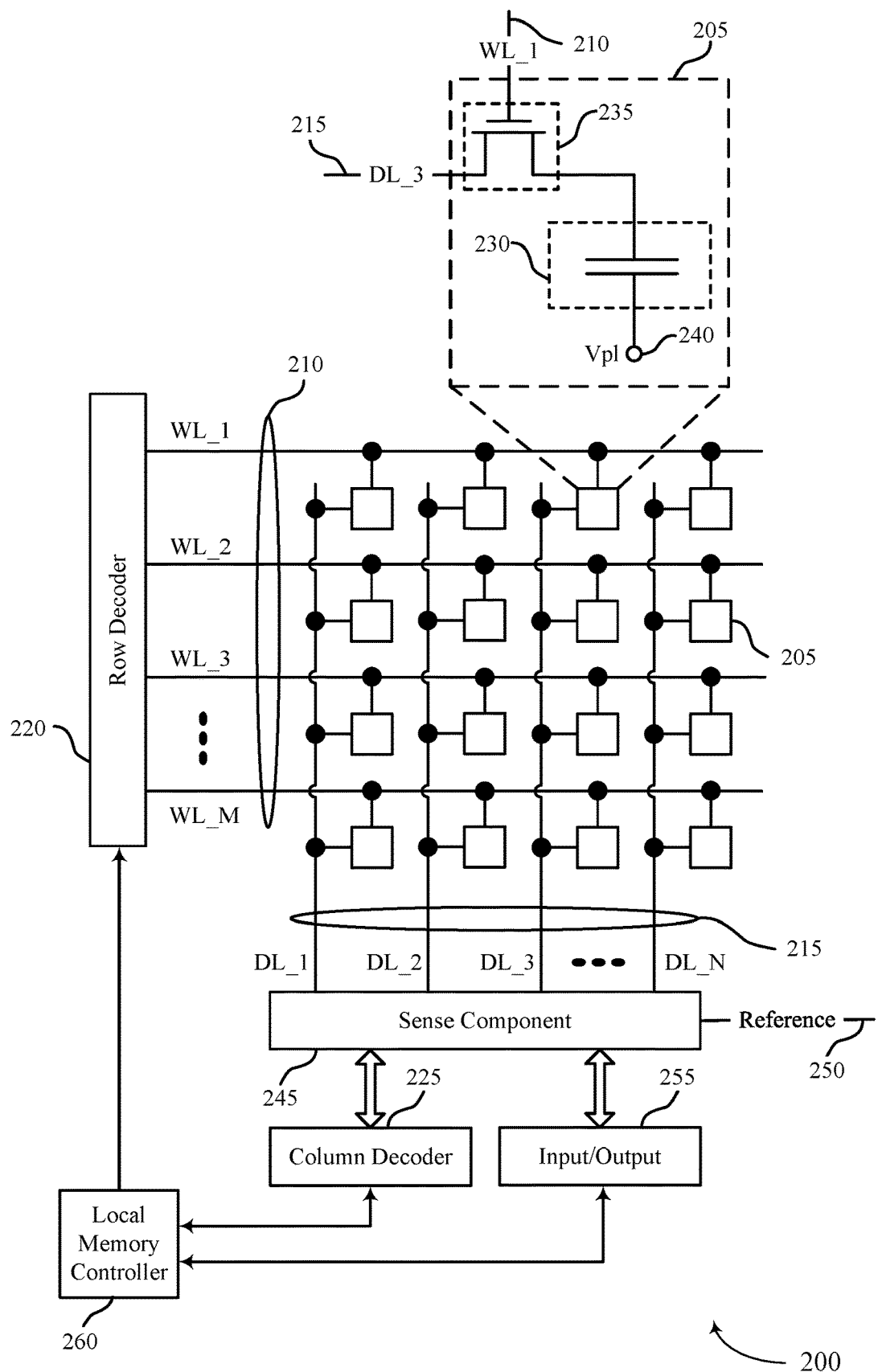
FIG. 2 illustrates an example of a memory die that supports address scrambling by linear maps in Galois fields in accordance with examples as disclosed herein.

FIG. 2 illustrates an example of a memory die 200 that supports address scrambling by linear maps in Galois fields in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that couples the memory cell 205 with a sense component 245. In some architectures, the memory cell 205 may be selectively coupled with the digit line 215 during portions of an access operation. For example, the word line 210 and the switching component 235 of the memory cell 205 may be operable to couple or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

In some examples, a memory device including memory die 200 may scramble an address in a first address space as part of generating an address in a second address space. For instance, the memory device may scramble a logical address as part of generating a physical address. Scrambling the address may increase a security of the memory device by decreasing a likelihood that an intercepting memory device determines the logical address to physical address mapping used by the memory device.

In order to scramble the address, the memory device may use a seed value to determine one of a set of circulant reordering matrices to apply to the address, where a circulant reordering matrix may be defined as a matrix produced by shifting the pattern of an identity matrix diagonally. The quantity of circulant reordering matrices possible for a matrix of a given size may be limited. For instance, for a matrix of size n, the quantity of circulant reordering matrices may also be equal to n. Increasing the quantity of matrices that the memory device may select among may increase a security of the memory device. For instance, the amount of time for an intercepting memory device to determine the correct logical address to physical address mapping may increase as the quantity of matrices that the memory device may select from increases.

In order to increase the quantity of matrices that the memory device may select among, the memory device may instead select from a set of bijective matrices. The set of bijective matrices may include matrices that are not circulant reordering matrices. For instance, the set of bijective matrices may include at least some matrices that are neither an identity matrix nor are produced by shifting an identity matrix diagonally.

Figure 3:
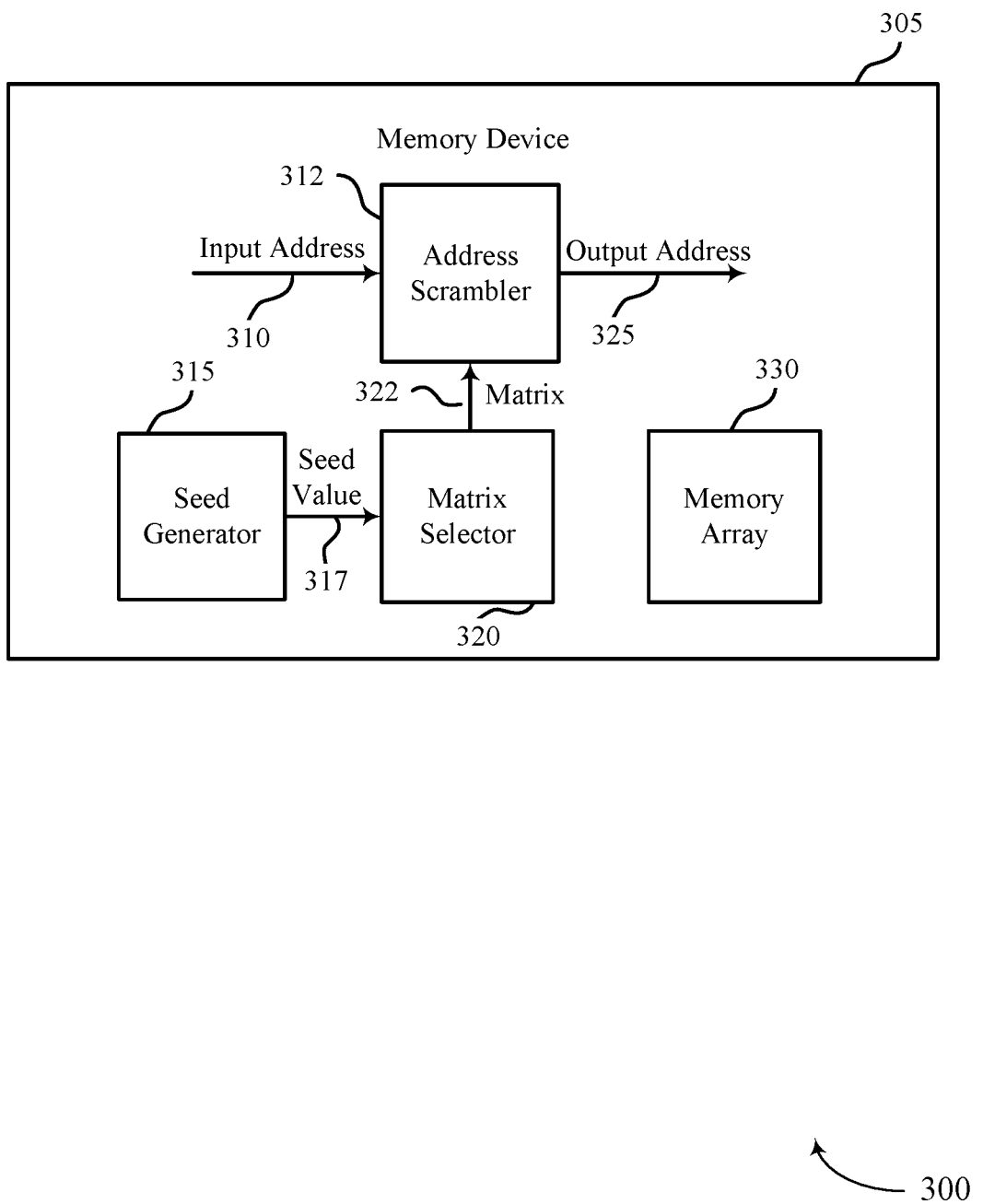
FIG. 3 illustrates an example of a scrambling scheme that supports address scrambling by linear maps in Galois fields in accordance with examples as disclosed herein.

FIG. 3 illustrates an example of a scrambling scheme 300 that supports address scrambling by linear maps in Galois fields in accordance with examples as disclosed herein. In some examples, scrambling scheme 300 may be an example of one or more aspects of system 100 and/or memory die 200. For instance, memory device 305 may be an example of a memory device 110 as described with reference to FIG. 1 and/or memory array 330 may be an example of a memory array 170 as described with reference to FIG. 1 or an array of a memory die 200 as described with reference to FIG. 2.

In some examples, memory device 305 may change (e.g., change randomly) a logical address to physical address map based on a power up condition. For instance, the memory device 305 may change the map whenever the memory device 305 identifies that it is performing a power up sequence (e.g., the memory device 305 receives a command from a host device associated with the memory device 305 performing the power up sequence). By changing the map based on the power up condition, the memory device 305 may prevent an intercepting device (e.g., a malicious user) from exploiting the map to attack the memory device 305 (e.g., a row hammer attack used to retrieve stored and/or to overwrite stored data).

In order to change the map, memory device 305 may scramble each address by applying a matrix to the address. For instance, the memory device 305 may generate a seed value 317 using a seed generator 315. The matrix selector 320 may select a matrix 322 from a set of matrices based on the seed value 317. The address scrambler 312 may apply the matrix 322 to an input address 310 in order to generate an output address 325.

In some examples, the input address 310 may be an address of a logical address space and the output address 325 may be an address of an intermediate address space or a physical address space. Conversely, the input address 310 may be an address of an intermediate address space or a physical address space and the output address 325 may be an address of a logical address space. Generally, a logical address space may correspond to a set of addresses that are addressable by a host device, whereas the physical address space corresponds to a second set of addresses, which may not be directly addressable by a host device. The intermediate address space may represent a third set of addresses that may undergo further processing before being in the physical address space.

In some examples, the memory device 305 may scramble the address using a circulant reordering map (e.g., a circulating map). A circulant reordering matrix may be defined as a matrix produced by shifting the pattern of an identity matrix diagonally. However, the quantity of circulant reordering matrices possible for a matrix of a given size may be limited. For instance, for a matrix of size n×n, the quantity of circulant reordering matrices may also be equal to n. If n=4, the four circulant reordering maps may be given as $$I_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, I_1 = \begin{bmatrix} 0 & 1 & 0 & 0 \\ 0 & 0 & 1 & 0 \\ 0 & 0 & 0 & 1 \\ 1 & 0 & 0 & 0 \end{bmatrix},$$

$$I_2 = \begin{bmatrix} 0 & 0 & 1 & 0 \\ 0 & 0 & 0 & 1 \\ 1 & 0 & 0 & 0 \\ 0 & 1 & 0 & 0 \end{bmatrix}, \text{ and } I_3 = \begin{bmatrix} 0 & 0 & 0 & 1 \\ 1 & 0 & 0 & 0 \\ 0 & 1 & 0 & 0 \\ 0 & 0 & 1 & 0 \end{bmatrix}.$$

Generally, increasing the quantity of matrices that the memory device 305 may select from may increase a security of the memory device 305. For instance, the amount of time for an intercepting device to determine the correct logical address to physical address mapping may increase as the quantity of matrices that the memory device 305 may select from increases. In order to increase the quantity of matrices that the memory device 305 may select among, the device may instead select from a set of bijective matrices. A matrix may be bijective if the determinant of the matrix is equal to 0.

A first set of bijective matrices that the memory device 305 may select from may be the set of reordering matrices. A reordering matrix may be defined as a matrix L in which each row has one-and-only-one non-zero entry and in which each column has one-and-only-one non-zero entry. For instance, an example of a reordering matrix that is not a circulant matrix may be $$L = \begin{bmatrix} 0 & 0 & 1 & 0 \\ 0 & 0 & 0 & 1 \\ 0 & 1 & 0 & 0 \\ 1 & 0 & 0 & 0 \end{bmatrix}.$$

Generally, reordering matrices may be considered a linear map and may have an inverse equal to a transpose of the matrix (e.g., L is orthogonal. An inverse of a matrix may be defined such that the multiplication of the matrix by its inverse generates an identity matrix of the same size as the matrix. Additionally, the total quantity of reordering matrices that the memory device 305 may select from may be equal to n! (e.g., 24 when n=4), which may be greater than the total quantity of circulant reordering maps.

A second set of bijective matrices that the memory device 305 may select from may be a set of non-reordering bijective matrices. For instance, the memory device 305 may select from a set of bijective matrices that have more than one element in at least one row or more than one element in at least one column. The total set of such matrices may be larger than the set of reordering matrices. Accordingly, the bit length of the seed value 317 may also be longer.

A third set of bijective matrices that the memory device 305 may select from may be a set of matrices generated using a Galois field. For instance, if x is an element in a Galois field $GF(2^n)$, then it may have a binary vector representation $$x = [x_0, \ldots, x_{n-1}] \begin{bmatrix} 1 \\ \alpha \\ \ldots \\ \alpha^{n-1} \end{bmatrix},$$

where $\alpha$ is a primitive element in $GF(2^n)$. A primitive element $\alpha$ may be defined as an element that equals 1 for $\alpha^p$ when $p=N-1$ and does not equal 1 for $\alpha^p$ when $p=1, 2 \ldots N-2$, where $N=2^n$. In some examples, a vector y may be determined as $$y = [y_0, \ldots, y_{n-1}] = [x_0, \ldots, x_{n-1}]$$

$$\alpha^j \begin{bmatrix} 1 \\ \alpha \\ \ldots \\ \alpha^{n-1} \end{bmatrix} = [x_0, \ldots, x_{n-1}] \begin{bmatrix} \alpha^j \\ \alpha^{j+1} \\ \ldots \\ \alpha^{j+n-1} \end{bmatrix} = [x_0, \ldots, x_{n-1}] M_j,$$

where j may represent the value of a seed (e.g., seed value 317. The inverse of the element $\alpha^j$ may be $\alpha^{-j}=\alpha^{n-1-j}$, as $\alpha^{N-1}=1$. As such, the inverse of $M_j$ may be $M_{-j}=M_{N-1-j}$ (e.g., $M_0=M_{N-1}$).

In order to scramble an address using a Galois field, a matrix $M_j$ may be selected using a random seed value 317 of value j. Additionally, an input address 310 of n bits may have each bit mapped to a corresponding bit value $x_0, \ldots, x_{n-1}$ and may be multiplied by $M_j$, thus generating an output address 325 of $y_0, \ldots, y_{n-1}$. Similarly, to descramble the address, the output address 325 may be multiplied by $M_{-j}$. Generally, there may be $N-1=2^n-1$ possible matrices selected for a matrix of size n×n generated using Galois fields, which may be greater than or equal to the quantity of possible reordering circulant maps of the same size. Additionally, it should be noted that there may be $2^n-1$ homogenous maps and n of bits for the seed value 317 may be sufficient to choose each possible homogenous map when generating matrices according to the techniques described herein.

In some examples, the output address 325 may be obtained by multiplying the input address 310 by $M_j$ and adding the result by $\alpha^k$, which may be an example of a linear map. For instance, if the output address is represented by $S(x)$, then $S(x)$ may be equal to $[x_0, \ldots, x_{n-1}]M_j + \alpha^k$. Likewise, the inverse of $S(x)$ may be determined as $[x_0, \ldots, x_{n-1}] = S(x) M_{-j} - \alpha^k M_{-j}$. The total quantity of linear maps using such techniques may be equal to $L_n=(2^n-1)2^n$. Accordingly, as $L_n < 2^{2n}$, 2n of bits for the seed value 317 may be sufficient to choose each possible linear map according to the techniques described herein (e.g., n bits for $\alpha^j$ and n bits for $\alpha^k$).

In some examples, a Galois field GF(N) may be defined by an irreducible polynomial f(x). The elements of the Galois field may be polynomials of degrees smaller than a degree of f(x) and each element may be vectors of the coefficients of these polynomials. As such, given a seed value 317 of value j, the element $\alpha^j$ may be a remainder of the polynomial division $$\frac{x^j}{f(x)},$$

which may be determined using a linear-feedback shift register. The inverse of $\alpha^j$ may be $\alpha^{-j}=\alpha^{n-1-j}$. The matrices $$M_j = \begin{bmatrix} \alpha^j \\ \alpha^{j+1} \\ \ldots \\ \alpha^{j+n-1} \end{bmatrix} \text{ and } M_{-j} = M_{N-1-j} = \begin{bmatrix} \alpha^{N-1-j} \\ \alpha^{N-1-j+1} \\ \ldots \\ \alpha^{N-1-j+n-1} \end{bmatrix}.$$

In some examples, if the exponent of $\alpha$ exceeds $N-2$, then the exponent may be considered mod(N-1). Additionally, a lookup table may be used to identify a mapping from j to $\alpha^j$ and the corresponding inverse (e.g., such that $\alpha^j$ and $\alpha^{-j}$ is not calculated each time j is selected).

In some examples, multiple bijective matrices may be selected for scrambling a single address. For instance, a first 8 bits of the seed value 317 may be used to select a first 8×8 bijective matrix, a second 8 bits of the seed value 317 may be used to select a second 8×8 bijective matrix, and a 4 bits of the seed value 317 may be used to select a 4×4 bijective matrix. Correspondingly, a first 8 bits of the input address 310 may be multiplied by the first 8×8 bijective matrix, a second 8 bits of the input address 310 may be multiplied by the second 8×8 bijective matrix, and 4 bits of the input address 310 may be multiplied by a 4×4 bijective matrix. In some examples, the outputs of these multiplications may undergo a bitwise XOR with other bits of the seed value 317 (e.g., 20 bits) to generate the output address. Additionally or alternatively, in some examples, a portion of the address may be scrambled (e.g., 8 bits may be scrambled and the remaining bits may not be scrambled).

After scrambling the map, the memory device may use the scrambled map to access memory array 330. For instance, the memory device may receive a command indicates a logical address and the memory device may scramble the logical address to generate a physical address or an intermediate address associated with a location in the memory array 330. The memory device may access (e.g., read or write) from the location in the memory array 330.

Figure 4:
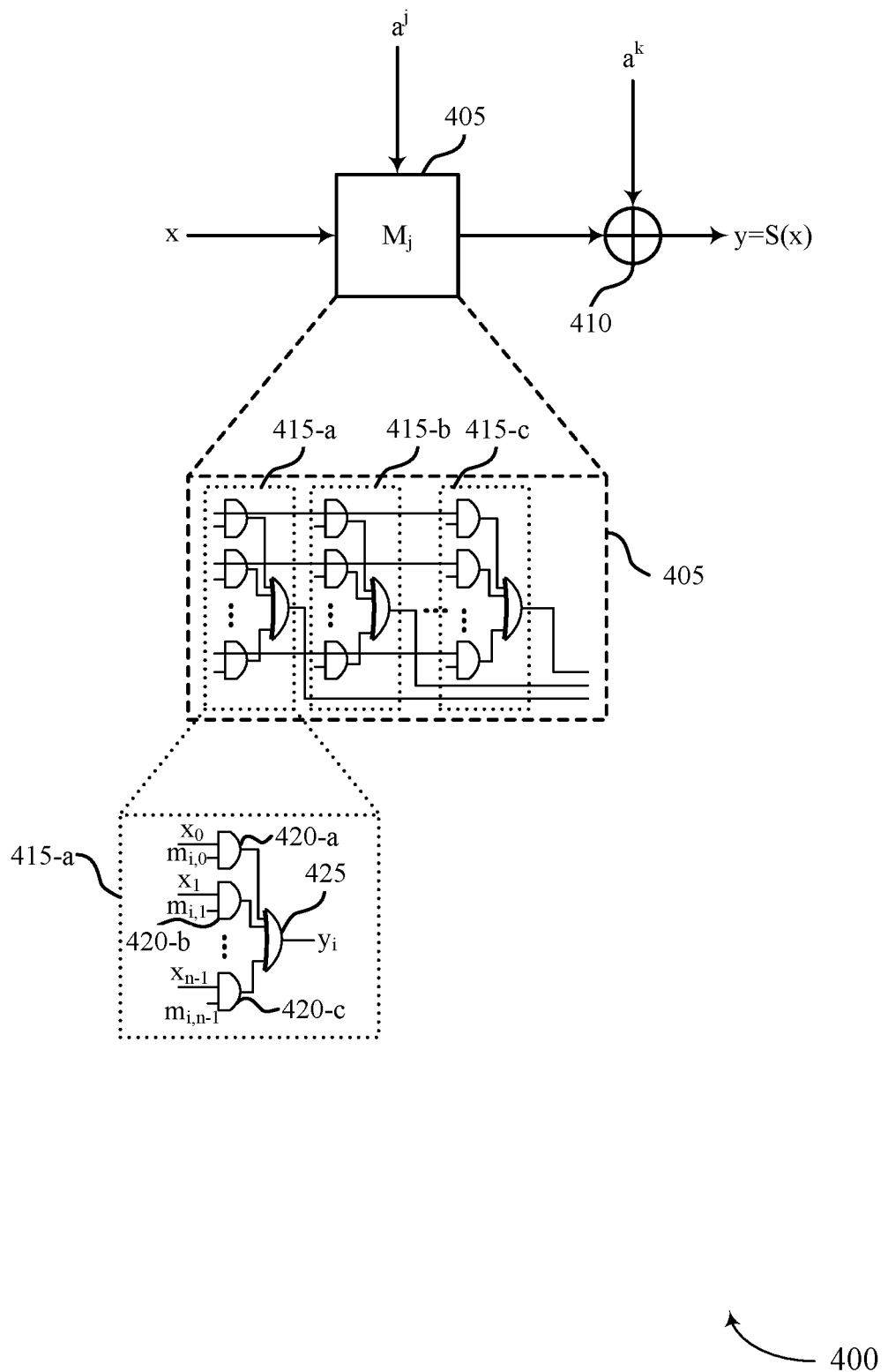
FIG. 4 illustrates an example of a scrambling circuit that supports address scrambling by linear maps in Galois fields in accordance with examples as disclosed herein.

FIG. 4 illustrates an example of a scrambling circuit 400 that supports address scrambling by linear maps in Galois fields in accordance with examples as disclosed herein. In some examples, scrambling circuit 400 may be an example of one or more aspects of scrambling circuit 400. For instance, scrambling circuit 400 may be an example of a circuit included in the address scrambler 312 of FIG. 3.

In some examples, scrambling circuit 400 may be used to scramble an address $[x_0, \ldots, x_{n-1}]$ using Galois fields. For instance, a matrix component 405 of the scrambling circuit may multiply $[x_0, \ldots, x_{n-1}]$ by a matrix $M_j$ generated using seed value j according to the techniques described herein (e.g., as described with reference to FIG. 3). The scrambling circuit 400 may add the result to $\alpha^k$ using adding component 410 to generate the output address $[y_0, \ldots, y_{n-1}]$. The operations performed by the scrambling circuit may be defined as $[y_0, \ldots, y_{n-1}] = [x_0, \ldots, x_{n-1}]M_j + \alpha^k$.

In some examples, matrix component 405 may include a set of matrix multiplication circuits 415-a, 415-b, and 415-c, where each matrix multiplication circuit is configured to multiply a respective column of $M_j$ with the input address $[x_0, \ldots, x_{n-1}]$ to generate a respective bit associated with the output address. For instance, matrix multiplication circuit 415-a may output a first bit, matrix multiplication circuit 415-b may output a second bit, and matrix multiplication circuit 415-c may output a third bit, where the first, second, and third bits are added with $\alpha^k$ to generate $y_0$, $y_1$, and $y_2$, respectively.

Each matrix multiplication circuit may include a set of AND gates and one or more XOR gates. For instance, matrix multiplication circuit 415-a may include AND gates 420-a, 420-b, and 420-c as well as XOR gate 425. Each AND gate may be coupled with a respective bit of the input address and a respective entry of one column of $M_j$. For instance, AND gate 420-a may be coupled with $x_0$ and $m_{i,0}$, AND gate 420-b may be coupled with $x_1$ and $m_{i,1}$, and AND gate 420-c may be coupled with $x_{n-1}$ and $m_{i,n-1}$. The outputs of AND gates 420-a, 420-b, and 420-c may be input to the XOR gate 425.

Additionally, the scrambling circuit 400 may be used to obtain a logical address from a physical address of an intermediate address. For instance, $[y_0, \ldots, y_{n-1}]$ may be input into matrix component 405 and multiplied with $M_{-j}$. In examples in which the adder component 410 is present, the result may be subtracted by $\alpha^k M_{-j}$ to obtain $[x_0, \ldots, x_{n-1}]$. In some such examples, each matrix multiplication circuit of matrix component 405 may be configured to multiply a respective column of $M_{-j}$ with the address $[y_0, \ldots, y_{n-1}]$ to generate a respective bit associated with address $[x_0, \ldots, x_{n-1}]$. For instance, matrix multiplication circuit 415-a may output a first bit, matrix multiplication circuit 415-b may output a second bit, and matrix multiplication circuit 415-c may output a third bit, where the first, second, and third bits are added with $\alpha^k M_{-j}$ to generate $x_0$, $x_1$, and $x_2$, respectively. Each AND gate of matrix multiplication circuit 415-a may be coupled with a respective bit of the address $[y_0, \ldots, y_{n-1}]$ and a respective entry of one column of $M_{-j}$. For instance, AND gate 420-a may be coupled with $y_0$ and $m_{i,0}$, AND gate 420-b may be coupled with $y_1$ and $m_{i,1}$, and AND gate 420-c may be coupled with $y_{n-1}$ and $m_{i,n-1}$. The outputs of AND gates 420-a, 420-b, and 420-c may be input to the XOR gate 425.

Figure 5:
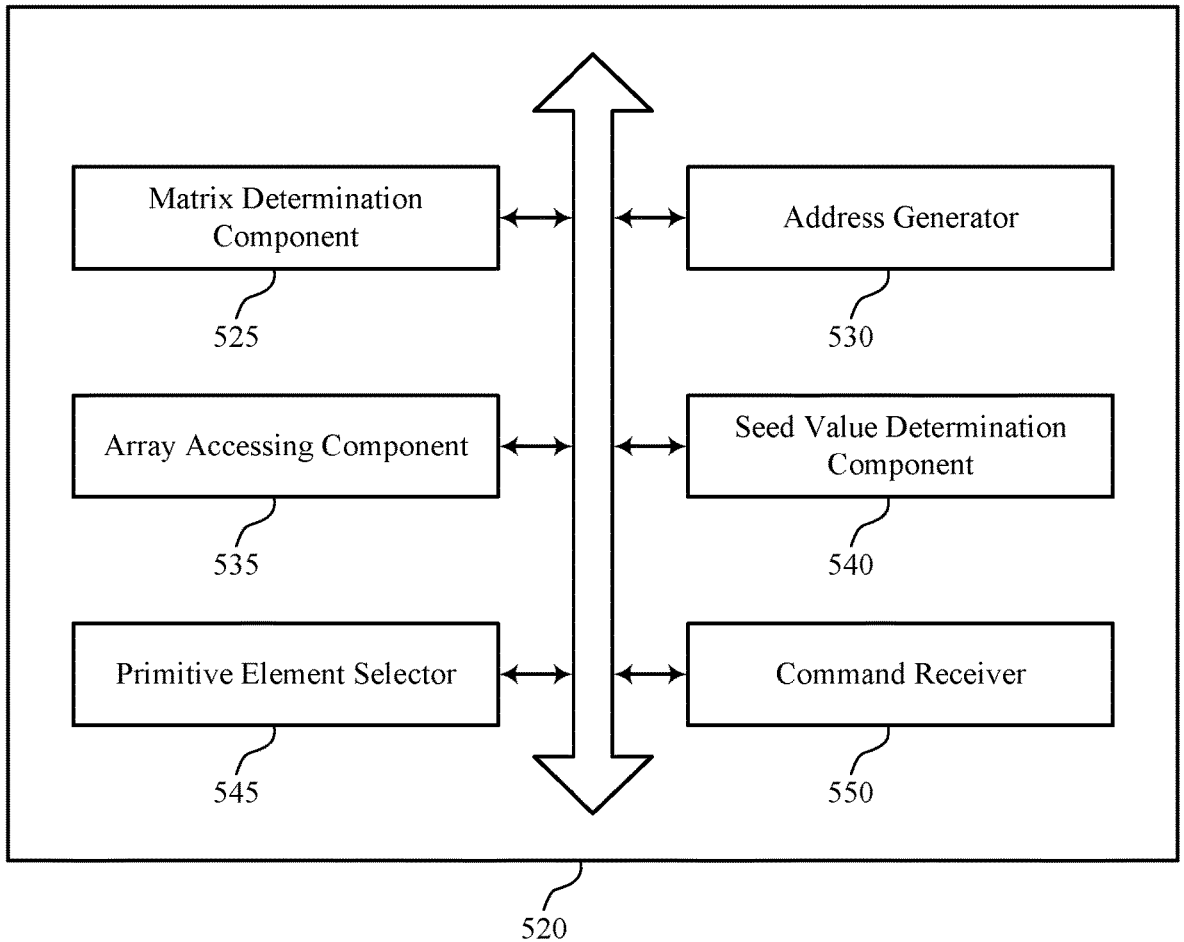
FIG. 5 shows a block diagram of a memory device that supports address scrambling by linear maps in Galois fields in accordance with examples as disclosed herein.

FIG. 5 shows a block diagram 500 of a Memory Device 520 that supports address scrambling by linear maps in Galois fields in accordance with examples as disclosed herein. The Memory Device 520 may be an example of aspects of a Memory Device as described with reference to FIGS. 1 through 4. The Memory Device 520, or various components thereof, may be an example of means for performing various aspects of address scrambling by linear maps in Galois fields as described herein. For example, the Memory Device 520 may include a matrix determination component 525, an address generator 530, an array accessing component 535, a seed value determination component 540, a primitive element selector 545, a command receiver 550, or any combination thereof. Each of these components may communicate, directly or indirectly, with one another (e.g., via one or more buses).

The matrix determination component 525 may be configured as or otherwise support a means for determining, based at least in part on a power up condition of a device and a seed value, a matrix that includes a set of columns, each column of the set of columns including elements associated with a set of rows, where a column of the set of columns or a row of the set of rows has at least two non-zero elements. The address generator 530 may be configured as or otherwise support a means for generating a first address of a first address space based at least in part on applying each column of the set of columns to at least a portion of a second address of a second address space. The array accessing component 535 may be configured as or otherwise support a means for accessing a memory array of the device based at least in part on generating the first address.

In some examples, the array accessing component 535 may be configured as or otherwise support a means for accessing the memory array based at least in part on a third address of the first address space. In some examples, the matrix determination component 525 may be configured as or otherwise support a means for determining a second matrix that includes a second set of columns, each column of the second set of columns including elements associated with a second set of rows, where the second matrix is an inverse of the matrix. In some examples, the address generator 530 may be configured as or otherwise support a means for generating a fourth address of the second address space based at least in part on applying each column of the second set of columns to at least a portion of the third address of the first address space.

In some examples, generating the first address of the first address space is based at least in part on the seed value being associated with a greater quantity of bits than the first address.

In some examples, to support determining the matrix, the primitive element selector 545 may be configured as or otherwise support a means for selecting a primitive element based at least in part on the seed value. In some examples, to support determining the matrix, the matrix determination component 525 may be configured as or otherwise support a means for generating the matrix based at least in part on the primitive element and a constant associated with the seed value.

In some examples, the command receiver 550 may be configured as or otherwise support a means for receiving a command that indicates the second address for accessing the memory array. In some examples, the address generator 530 may be configured as or otherwise support a means for determining a third address of a third address space based at least in part on the first address, where the third address space includes a physical address space, where accessing the memory array includes accessing the memory array using the third address.

In some examples, to support generating the first address of the first address space, the address generator 530 may be configured as or otherwise support a means for generating a first vector based at least in part on applying each column of the set of columns to the at least the portion of the second address. In some examples, to support generating the first address of the first address space, the address generator 530 may be configured as or otherwise support a means for generating the first address of the first address space based at least in part on combining the first vector with a second vector, where the second vector is based at least in part on the seed value.

In some examples, the matrix determination component 525 may be configured as or otherwise support a means for selecting, based at least in part on a power up condition of a device, a matrix from among a set of bijective matrices, where a column or a row of at least one of the set of bijective matrices has at least two non-zero elements. In some examples, the address generator 530 may be configured as or otherwise support a means for generating a first address of a first address space based at least in part on applying the matrix to at least a portion of a second address of a second address space. In some examples, the array accessing component 535 may be configured as or otherwise support a means for accessing a memory array of the device based at least in part on generating the first address.

In some examples, the array accessing component 535 may be configured as or otherwise support a means for accessing the memory array based at least in part on a third address of the first address space. In some examples, the matrix determination component 525 may be configured as or otherwise support a means for determining a second matrix that includes a second set of columns, where the second matrix is an inverse of the matrix. In some examples, the address generator 530 may be configured as or otherwise support a means for generating a fourth address of the second address space based at least in part on applying each column of the second set of columns to at least a portion of the third address of the first address space.

In some examples, the at least the portion of the second address includes a first portion of the second address, and the matrix determination component 525 may be configured as or otherwise support a means for selecting, from among the set of bijective matrices, a second matrix based at least in part on determining the power up condition of the device, where generating the first address includes applying the second matrix to a second portion of the second address of the second address space.

In some examples, the matrix is associated with a first seed value and the second matrix is associated with a second seed value different than the first seed value.

In some examples, the at least the portion of the second address includes a first portion of the second address, and the matrix determination component 525 may be configured as or otherwise support a means for selecting, from among a second set of bijective matrices, a second matrix based at least in part on determining the power up condition of the device, where a column or a row of at least one of the second set of bijective matrices has at least two non-zero elements, and where the second set of bijective matrices excludes each matrix of the set of bijective matrices, and where generating the first address includes applying the second matrix to a second portion of the second address of the second address space.

In some examples, each matrix of the set of bijective matrices is associated with a first size. In some examples, each matrix of the second set of bijective matrices is associated with a second size different than the first size.

In some examples, the command receiver 550 may be configured as or otherwise support a means for receiving a command that indicates the second address for accessing the memory array. In some examples, the address generator 530 may be configured as or otherwise support a means for determining a third address of a third address space based at least in part on the first address, where the third address space includes a physical address space, where accessing the memory array includes accessing the memory array using the third address.

In some examples, where each of the at least two non-zero elements has a same value.

In some examples, the set of bijective matrices includes a first subset of matrices that are reordering matrices and a second subset of matrices that are not reordering matrices.

The seed value determination component 540 may be configured as or otherwise support a means for determining, based at least in part on a power up condition of a device, a seed value including a first quantity of bits. In some examples, the matrix determination component 525 may be configured as or otherwise support a means for selecting a matrix from a set of bijective matrices based at least in part on the seed value, the matrix including a set of columns, each column of the set of columns including elements associated with a set of rows, where a column or a row of at least one of the set of bijective matrices as at least two non-zero elements. In some examples, the address generator 530 may be configured as or otherwise support a means for generating a first address of a first address space based at least in part on applying each column of the set of columns to at least a portion of a second address of a second address space, where the each of the first address and the second address are associated with a second quantity of bits, and where the first quantity is greater than the second quantity. In some examples, the array accessing component 535 may be configured as or otherwise support a means for accessing a memory array of the device based at least in part on generating the first address.

In some examples, the array accessing component 535 may be configured as or otherwise support a means for accessing the memory array based at least in part on a third address of the first address space. In some examples, the matrix determination component 525 may be configured as or otherwise support a means for determining, based at least in part on the seed value, a second matrix that includes a second set of columns, each column of the second set of columns including elements associated with a second set of rows, where the second matrix is an inverse of the matrix. In some examples, the address generator 530 may be configured as or otherwise support a means for generating a fourth address of the second address space based at least in part on applying each column of the second set of columns to at least a portion of the third address of the first address space.

In some examples, to support selecting the matrix, the primitive element selector 545 may be configured as or otherwise support a means for selecting a primitive element based at least in part on the seed value. In some examples, to support selecting the matrix, the matrix determination component 525 may be configured as or otherwise support a means for generating the matrix based at least in part on the primitive element and a constant associated with the seed value.

In some examples, the command receiver 550 may be configured as or otherwise support a means for receiving a command that indicates the second address for accessing the memory array. In some examples, the address generator 530 may be configured as or otherwise support a means for determining a third address of a third address space based at least in part on the first address, where the third address space includes a physical address space, where accessing the memory array includes accessing the memory array using the third address.

In some examples, to support generating the first address of the first address space, the address generator 530 may be configured as or otherwise support a means for generating a first vector based at least in part on applying each column of the set of columns to the at least the portion of the second address. In some examples, to support generating the first address of the first address space, the address generator 530 may be configured as or otherwise support a means for generating the first address of the first address space based at least in part on combining the first vector with a second vector, where the second vector is based at least in part on the seed value.

Figure 6:
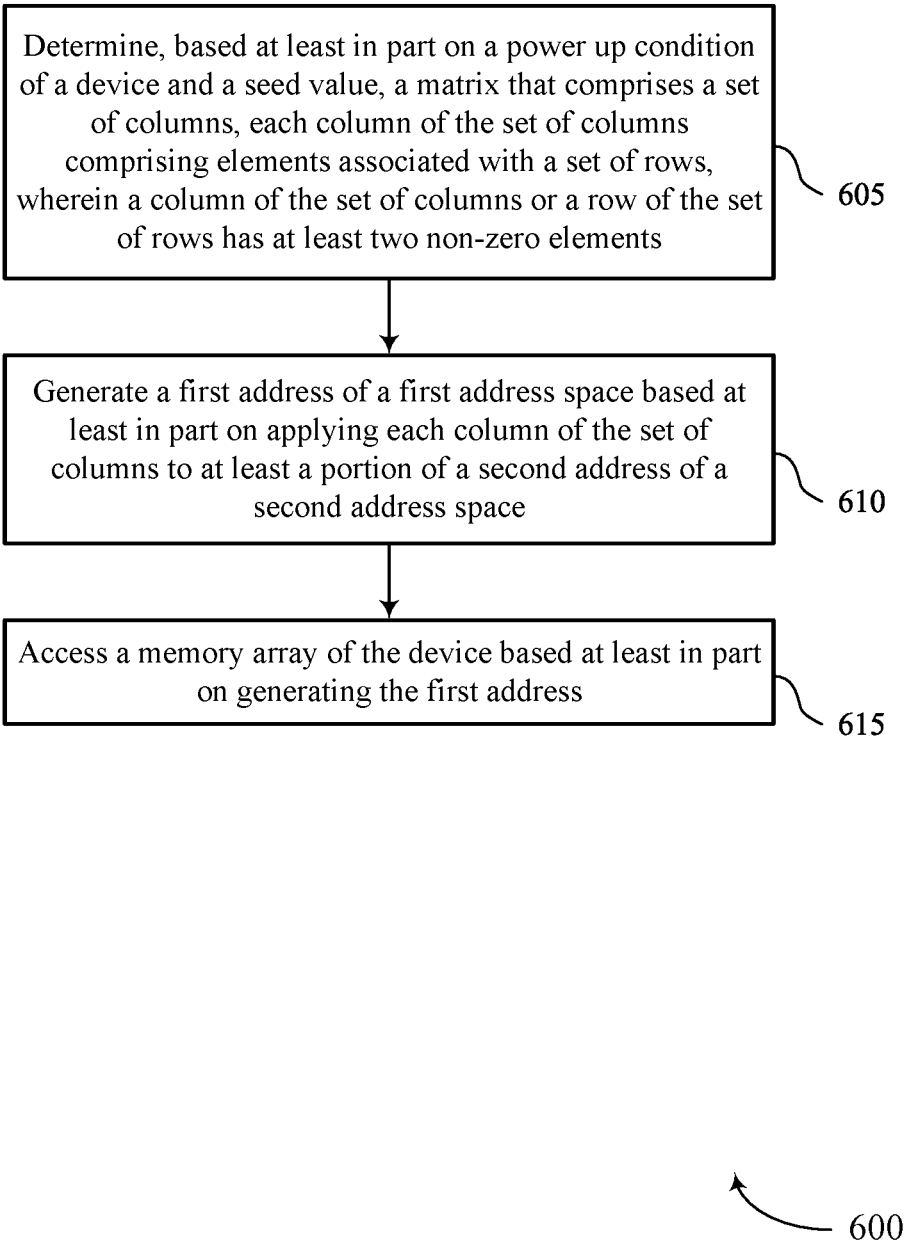
FIGS. 6 and 7 show flowcharts illustrating a method or methods that support address scrambling by linear maps in Galois fields in accordance with examples as disclosed herein.

FIG. 6 shows a flowchart illustrating a method 600 that supports address scrambling by linear maps in Galois fields in accordance with examples as disclosed herein. The operations of method 600 may be implemented by a Memory Device or its components as described herein. For example, the operations of method 600 may be performed by a Memory Device as described with reference to FIGS. 1 through 5. In some examples, a Memory Device may execute a set of instructions to control the functional elements of the device to perform the described functions. Additionally, or alternatively, the Memory Device may perform aspects of the described functions using special-purpose hardware.

At 605, the method may include determining, based at least in part on a power up condition of a device and a seed value, a matrix that includes a set of columns, each column of the set of columns including elements associated with a set of rows, where a column of the set of columns or a row of the set of rows has at least two non-zero elements. The operations of 605 may be performed in accordance with examples as disclosed herein. In some examples, aspects of the operations of 605 may be performed by a matrix determination component 525 as described with reference to FIG. 5.

At 610, the method may include generating a first address of a first address space based at least in part on applying each column of the set of columns to at least a portion of a second address of a second address space. The operations of 610 may be performed in accordance with examples as disclosed herein. In some examples, aspects of the operations of 610 may be performed by an address generator 530 as described with reference to FIG. 5.

At 615, the method may include accessing a memory array of the device based at least in part on generating the first address. The operations of 615 may be performed in accordance with examples as disclosed herein. In some examples, aspects of the operations of 615 may be performed by an array accessing component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, based at least in part on a power up condition of a device and a seed value, a matrix that includes a set of columns, each column of the set of columns including elements associated with a set of rows, where a column of the set of columns or a row of the set of rows has at least two non-zero elements; generating a first address of a first address space based at least in part on applying each column of the set of columns to at least a portion of a second address of a second address space; and accessing a memory array of the device based at least in part on generating the first address.

Aspect 2: The method, apparatus, or non-transitory computer-readable medium of aspect 1, further including operations, features, circuitry, logic, means, or instructions, or any combination thereof for accessing the memory array based at least in part on a third address of the first address space; determining a second matrix that includes a second set of columns, each column of the second set of columns including elements associated with a second set of rows, where the second matrix is an inverse of the matrix; and generating a fourth address of the second address space based at least in part on applying each column of the second set of columns to at least a portion of the third address of the first address space.

Aspect 3: The method, apparatus, or non-transitory computer-readable medium of any of aspects 1 through 2 where generating the first address of the first address space is based at least in part on the seed value being associated with a greater quantity of bits than the first address.

Aspect 4: The method, apparatus, or non-transitory computer-readable medium of any of aspects 1 through 3 where determining the matrix includes operations, features, circuitry, logic, means, or instructions, or any combination thereof for selecting a primitive element based at least in part on the seed value and generating the matrix based at least in part on the primitive element and a constant associated with the seed value.

Aspect 5: The method, apparatus, or non-transitory computer-readable medium of any of aspects 1 through 4, further including operations, features, circuitry, logic, means, or instructions, or any combination thereof for receiving a command that indicates the second address for accessing the memory array and determining a third address of a third address space based at least in part on the first address, where the third address space includes a physical address space, where accessing the memory array includes accessing the memory array using the third address.

Aspect 6: The method, apparatus, or non-transitory computer-readable medium of any of aspects 1 through 5 including operations, features, circuitry, logic, means, or instructions, or any combination thereof for.

Aspect 7: The method, apparatus, or non-transitory computer-readable medium of any of aspects 1 through 6 where generating the first address of the first address space includes operations, features, circuitry, logic, means, or instructions, or any combination thereof for generating a first vector based at least in part on applying each column of the set of columns to the at least the portion of the second address and generating the first address of the first address space based at least in part on combining the first vector with a second vector, where the second vector is based at least in part on the seed value.

Figure 7:
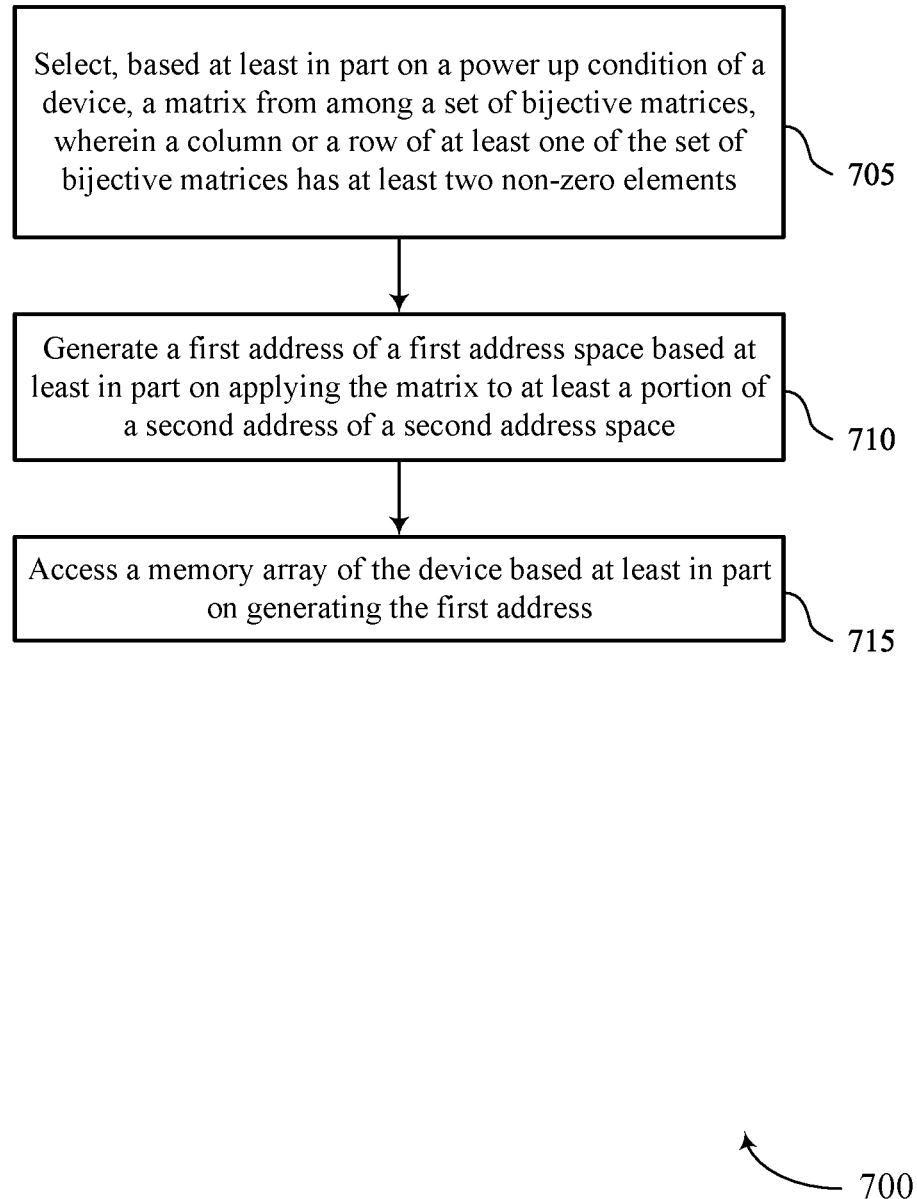

FIG. 7 shows a flowchart illustrating a method 700 that supports address scrambling by linear maps in Galois fields in accordance with examples as disclosed herein. The operations of method 700 may be implemented by a Memory Device or its components as described herein. For example, the operations of method 700 may be performed by a Memory Device as described with reference to FIGS. 1 through 5. In some examples, a Memory Device may execute a set of instructions to control the functional elements of the device to perform the described functions. Additionally, or alternatively, the Memory Device may perform aspects of the described functions using special-purpose hardware.

At 705, the method may include selecting, based at least in part on a power up condition of a device, a matrix from among a set of bijective matrices, where a column or a row of at least one of the set of bijective matrices has at least two non-zero elements. The operations of 705 may be performed in accordance with examples as disclosed herein. In some examples, aspects of the operations of 705 may be performed by a matrix determination component 525 as described with reference to FIG. 5.

At 710, the method may include generating a first address of a first address space based at least in part on applying the matrix to at least a portion of a second address of a second address space. The operations of 710 may be performed in accordance with examples as disclosed herein. In some examples, aspects of the operations of 710 may be performed by an address generator 530 as described with reference to FIG. 5.

At 715, the method may include accessing a memory array of the device based at least in part on generating the first address. The operations of 715 may be performed in accordance with examples as disclosed herein. In some examples, aspects of the operations of 715 may be performed by an array accessing component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for selecting, based at least in part on a power up condition of a device, a matrix from among a set of bijective matrices, where a column or a row of at least one of the set of bijective matrices has at least two non-zero elements; generating a first address of a first address space based at least in part on applying the matrix to at least a portion of a second address of a second address space; and accessing a memory array of the device based at least in part on generating the first address.

Aspect 9: The method, apparatus, or non-transitory computer-readable medium of aspect 8, further including operations, features, circuitry, logic, means, or instructions, or any combination thereof for accessing the memory array based at least in part on a third address of the first address space; determining a second matrix that includes a second set of columns, where the second matrix is an inverse of the matrix; and generating a fourth address of the second address space based at least in part on applying each column of the second set of columns to at least a portion of the third address of the first address space.

Aspect 10: The method, apparatus, or non-transitory computer-readable medium of any of aspects 8 through 9 where the at least the portion of the second address includes a first portion of the second address and the method, apparatuses, and non-transitory computer-readable medium, further includes operations, features, circuitry, logic, means, or instructions, or any combination thereof for selecting, from among the set of bijective matrices, a second matrix based at least in part on determining the power up condition of the device, where generating the first address includes applying the second matrix to a second portion of the second address of the second address space.

Aspect 11: The method, apparatus, or non-transitory computer-readable medium of aspect 10 where the matrix is associated with a first seed value and the second matrix is associated with a second seed value different than the first seed value.

Aspect 12: The method, apparatus, or non-transitory computer-readable medium of any of aspects 8 through 11 where the at least the portion of the second address includes a first portion of the second address and the method, apparatuses, and non-transitory computer-readable medium, further includes operations, features, circuitry, logic, means, or instructions, or any combination thereof for selecting, from among a second set of bijective matrices, a second matrix based at least in part on determining the power up condition of the device, where a column or a row of at least one of the second set of bijective matrices has at least two non-zero elements, and where the second set of bijective matrices excludes each matrix of the set of bijective matrices, and where generating the first address includes applying the second matrix to a second portion of the second address of the second address space.

Aspect 13: The method, apparatus, or non-transitory computer-readable medium of aspect 12 where each matrix of the set of bijective matrices is associated with a first size and each matrix of the second set of bijective matrices is associated with a second size different than the first size.

Aspect 14: The method, apparatus, or non-transitory computer-readable medium of any of aspects 8 through 13, further including operations, features, circuitry, logic, means, or instructions, or any combination thereof for receiving a command that indicates the second address for accessing the memory array and determining a third address of a third address space based at least in part on the first address, where the third address space includes a physical address space, where accessing the memory array includes accessing the memory array using the third address.

Aspect 15: The method, apparatus, or non-transitory computer-readable medium of any of aspects 8 through 14 where each of the at least two non-zero elements has a same value.

Aspect 16: The method, apparatus, or non-transitory computer-readable medium of any of aspects 8 through 15 where the set of bijective matrices includes a first subset of matrices that are reordering matrices and a second subset of matrices that are not reordering matrices.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 17: An apparatus, including: a first circuit configured to select, based at least in part on a power up condition of the apparatus and a seed value, a matrix from a set of bijective matrices, where a column or a row of at least one of the set of bijective matrices as at least two non-zero elements; a second circuit configured to determine a first address of a first address space based on a matrix multiplication of a second address of a second address space with the matrix; and a third circuit configured to access a memory array based at least in part on the first address.

Aspect 18: The apparatus of aspect 17, where, to determine the first address of the first address space, the second circuit is configured to: perform a combinatorial multiplication of each bit of the second address of the second address space with a respective bit of a column of the matrix; and output a bit of the first address of the first address space based at least in part on performing the combinatorial multiplication.

Aspect 19: The apparatus of aspect 18, where the second circuit is further configured to output a set of bits based at least in part on performing the combinatorial multiplication of each bit of the second address of the second address space with the respective bit of the column of the matrix, and the second circuit being configured to output the bit of the first address of the first address space is based at least in part on the second circuit being further configured to perform a combinatorial sum on the set of bits.

Aspect 20: The apparatus of any of aspects 17 through 19, where: the first circuit is further configured to select a second matrix, the second matrix being an inverse of the matrix; and the second circuit is further configured to, based at least in part on the third circuit accessing the memory array based at least in part on a third address of the first address space, determine a fourth address of the second address space based at least in part on a matrix multiplication of the third address of the first address space with the second matrix.

Aspect 21: The apparatus of any of aspects 17 through 20, where the apparatus is configured to: receive a command that indicates the second address for accessing the memory array; and determine a third address of a third address space based at least in part on the first address, where the third address space includes a physical address space.

Aspect 22: The apparatus of any of aspects 17 through 21, where the set of bijective matrices includes a first subset of matrices that are reordering matrices and a second subset of matrices that are not reordering matrices.

An apparatus is described. The following provides an overview of aspects of the apparatus as described herein:

Aspect 23: An apparatus, including: a first circuit configured to select, based at least in part on a power up condition of the apparatus, a seed value including a first quantity of bits; a second circuit configured to select a matrix from a set of bijective matrices based at least in part on the seed value, the matrix including a set of columns, each column of the set of columns including elements associated with a set of rows, where a column or a row of at least one of the set of bijective matrices as at least two non-zero elements; a third circuit configured to generate a first address of a first address space based at least in part on applying each column of the set of columns to at least a portion of a second address of a second address space, where the each of the first address and the second address are associated with a second quantity of bits, and where the first quantity is greater than the second quantity; and a fourth circuit configured to access a memory array of the apparatus based at least in part on the first address.

Aspect 24: The apparatus of aspect 23, where, to determine the first address of the first address space, the second circuit is configured to: perform a combinatorial multiplication of each bit of the second address of the second address space with a respective bit of a column of the matrix; and output a bit of the first address of the first address space based at least in part on performing the combinatorial multiplication.

Aspect 25: The apparatus of aspect 24, where the second circuit is further configured to output a set of bits based at least in part on performing the combinatorial multiplication of each bit of the second address of the second address space with the respective bit of the column of the matrix, and the second circuit being configured to output the bit of the first address of the first address space is based at least in part on the second circuit being further configured to perform a combinatorial sum on the set of bits.

Aspect 26: The apparatus of any of aspects 23 through 25, where: the first circuit is further configured to select a second matrix, the second matrix being an inverse of the matrix; and the second circuit is further configured to, based at least in part on the third circuit accessing the memory array based at least in part on a third address of the first address space, determine a fourth address of the second address space based at least in part on a matrix multiplication of the third address of the first address space with the second matrix.

Aspect 27: The apparatus of any of aspects 23 through 26, where, to select the matrix, the second circuit is further configured to: select a primitive element based at least in part on the seed value; and generate the matrix based at least in part on the primitive element and a constant associated with the seed value.

Aspect 28: The apparatus of any of aspects 23 through 27, where the apparatus is configured to: receive a command that indicates the second address for accessing the memory array; and determine a third address of a third address space based at least in part on the first address, where the third address space includes a physical address space.

Aspect 29: The apparatus of any of aspects 23 through 28, where the set of bijective matrices includes a first subset of matrices that are reordering matrices and a second subset of matrices that are not reordering matrices.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   determining, based at least in part on a power up condition of a device and a seed value, a matrix that comprises a set of columns, each column of the set of columns comprising elements associated with a set of rows, wherein a column of the set of columns or a row of the set of rows has at least two non-zero elements;
   generating a first address of a first address space based at least in part on applying each column of the set of columns to at least a portion of a second address of a second address space;
   accessing a memory array of the device based at least in part on generating the first address;
   accessing the memory array based at least in part on a third address of the first address space;
   determining a second matrix that comprises a second set of columns, each column of the second set of columns comprising elements associated with a second set of rows, wherein the second matrix is an inverse of the matrix; and
   generating a fourth address of the second address space based at least in part on applying each column of the second set of columns to at least a portion of the third address of the first address space.

2. The method of claim 1, wherein generating the first address of the first address space is based at least in part on the seed value being associated with a greater quantity of bits than the first address.

3. The method of claim 1, wherein determining the matrix comprises:
   selecting a primitive element based at least in part on the seed value; and
   generating the matrix based at least in part on the primitive element and a constant associated with the seed value.

4. The method of claim 1, further comprising:
   receiving a command that indicates the second address for accessing the memory array; and
   determining a third address of a third address space based at least in part on the first address, wherein the third address space comprises a physical address space, wherein accessing the memory array comprises accessing the memory array using the third address.

5. The method of claim 1, where each of the at least two non-zero elements has a same value.

6. The method of claim 1, wherein generating the first address of the first address space comprises:
   generating a first vector based at least in part on applying each column of the set of columns to the at least the portion of the second address; and
   generating the first address of the first address space based at least in part on combining the first vector with a second vector, wherein the second vector is based at least in part on the seed value.

7. A method, comprising:
   selecting, based at least in part on a power up condition of a device, a matrix from among a set of bijective matrices, wherein a column or a row of at least one of the set of bijective matrices has at least two non-zero elements, wherein the set of bijective matrices comprises a first subset of matrices that are reordering matrices and a second subset of matrices that are not reordering matrices;
   generating a first address of a first address space based at least in part on applying the matrix to at least a portion of a second address of a second address space; and
   accessing a memory array of the device based at least in part on generating the first address.

8. A method comprising:
   selecting, based at least in part on a power up condition of a device, a matrix from among a set of bijective matrices, wherein a column or a row of at least one of the set of bijective matrices has at least two non-zero elements;
   generating a first address of a first address space based at least in part on applying the matrix to at least a portion of a second address of a second address space;
   accessing a memory array of the device based at least in part on generating the first address;
   accessing the memory array based at least in part on a third address of the first address space;
   determining a second matrix that comprises a second set of columns, wherein the second matrix is an inverse of the matrix; and
   generating a fourth address of the second address space based at least in part on applying each column of the second set of columns to at least a portion of the third address of the first address space.

9. The method of claim 7, wherein the at least the portion of the second address comprises a first portion of the second address, the method further comprising:
   selecting, from among the set of bijective matrices, a second matrix based at least in part on determining the power up condition of the device, wherein generating the first address comprises applying the second matrix to a second portion of the second address of the second address space.

10. The method of claim 9, wherein the matrix is associated with a first seed value and the second matrix is associated with a second seed value different than the first seed value.

11. The method of claim 7, wherein the at least the portion of the second address comprises a first portion of the second address, the method further comprising:
    selecting, from among a second set of bijective matrices, a second matrix based at least in part on determining the power up condition of the device, wherein a column or a row of at least one of the second set of bijective matrices has at least two non-zero elements, and wherein the second set of bijective matrices excludes each matrix of the set of bijective matrices, and wherein generating the first address comprises applying the second matrix to a second portion of the second address of the second address space.

12. The method of claim 11, wherein:
    each matrix of the set of bijective matrices is associated with a first size, and
    each matrix of the second set of bijective matrices is associated with a second size different than the first size.

13. The method of claim 7, further comprising:
    receiving a command that indicates the second address for accessing the memory array; and
    determining a third address of a third address space based at least in part on the first address, wherein the third address space comprises a physical address space, wherein accessing the memory array comprises accessing the memory array using the third address.

14. The method of claim 7, wherein where each of the at least two non-zero elements has a same value.

15. An apparatus, comprising:
a first circuit configured to select, based at least in part on a power up condition of the apparatus and a seed value, a matrix from a set of bijective matrices, wherein a column or a row of at least one of the set of bijective matrices as at least two non-zero elements, wherein the set of bijective matrices comprises a first subset of matrices that are reordering matrices and a second subset of matrices that are not reordering matrices;
a second circuit configured to determine a first address of a first address space based on a matrix multiplication of a second address of a second address space with the matrix; and
a third circuit configured to access a memory array based at least in part on the first address.

16. The apparatus of claim 15, wherein, to determine the first address of the first address space, the second circuit is configured to:
perform a combinatorial multiplication of each bit of the second address of the second address space with a respective bit of a column of the matrix; and
output a bit of the first address of the first address space based at least in part on performing the combinatorial multiplication.

17. The apparatus of claim 16, wherein:
the second circuit is further configured to output a set of bits based at least in part on performing the combinatorial multiplication of each bit of the second address of the second address space with the respective bit of the column of the matrix, and
the second circuit being configured to output the bit of the first address of the first address space is based at least in part on the second circuit being further configured to perform a combinatorial sum on the set of bits.

18. An apparatus, comprising:
a first circuit configured to select, based at least in part on a power up condition of the apparatus and a seed value, a matrix from a set of bijective matrices, wherein a column or a row of at least one of the set of bijective matrices as at least two non-zero elements, wherein the first circuit is further configured to select a second matrix, the second matrix being an inverse of the matrix;
a second circuit configured to determine a first address of a first address space based on a matrix multiplication of a second address of a second address space with the matrix; and
a third circuit configured to access a memory array based at least in part on the first address, wherein the second circuit is further configured to, based at least in part on the third circuit accessing the memory array based at least in part on a third address of the first address space, determine a fourth address of the second address space based at least in part on a matrix multiplication of the third address of the first address space with the second matrix.

19. The apparatus of claim 15, wherein the apparatus is configured to:
receive a command that indicates the second address for accessing the memory array; and
determine a third address of a third address space based at least in part on the first address, wherein the third address space comprises a physical address space, 20. A method, comprising:
determining, based at least in part on a power up condition of a device, a seed value comprising a first quantity of bits;
selecting a matrix from a set of bijective matrices based at least in part on the seed value, the matrix comprising a set of columns, each column of the set of columns comprising elements associated with a set of rows, wherein a column or a row of at least one of the set of bijective matrices as at least two non-zero elements;
generating a first address of a first address space based at least in part on applying each column of the set of columns to at least a portion of a second address of a second address space, wherein each of the first address and the second address are associated with a second quantity of bits, and wherein the first quantity is greater than the second quantity;
accessing a memory array of the device based at least in part on generating the first address;
accessing the memory array based at least in part on a third address of the first address space;
determining, based at least in part on the seed value, a second matrix that comprises a second set of columns, each column of the second set of columns comprising elements associated with a second set of rows, wherein the second matrix is an inverse of the matrix; and
generating a fourth address of the second address space based at least in part on applying each column of the second set of columns to at least a portion of the third address of the first address space.

21. The method of claim 20, wherein selecting the matrix comprises:
selecting a primitive element based at least in part on the seed value; and
generating the matrix based at least in part on the primitive element and a constant associated with the seed value.

22. The method of claim 20, further comprising:
receiving a command that indicates the second address for accessing the memory array; and
determining a third address of a third address space based at least in part on the first address, wherein the third address space comprises a physical address space, wherein accessing the memory array comprises accessing the memory array using the third address.

23. The method of claim 20, where each of the at least two non-zero elements has a same value.

24. The method of claim 20, wherein generating the first address of the first address space comprises:
generating a first vector based at least in part on applying each column of the set of columns to the at least the portion of the second address; and
generating the first address of the first address space based at least in part on combining the first vector with a second vector, wherein the second vector is based at least in part on the seed value.

25. An apparatus, comprising:
a first circuit configured to select, based at least in part on a power up condition of the apparatus, a seed value comprising a first quantity of bits;
a second circuit configured to select a matrix from a set of bijective matrices based at least in part on the seed value, the matrix comprising a set of columns, each column of the set of columns comprising elements associated with a set of rows, wherein a column or a row of at least one of the set of bijective matrices as at least two non-zero elements, wherein the set of bijective matrices comprises a first subset of matrices that are reordering matrices and a second subset of matrices that are not reordering matrices;

a third circuit configured to generate a first address of a first address space based at least in part on applying each column of the set of columns to at least a portion of a second address of a second address space, wherein each of the first address and the second address are associated with a second quantity of bits, and wherein the first quantity is greater than the second quantity; and a fourth circuit configured to access a memory array of the apparatus based at least in part on the first address.

26. The apparatus of claim 25, wherein, to determine the first address of the first address space, the second circuit is configured to:

perform a combinatorial multiplication of each bit of the second address of the second address space with a respective bit of a column of the matrix; and output a bit of the first address of the first address space based at least in part on performing the combinatorial multiplication.

27. The apparatus of claim 26, wherein:

the second circuit is further configured to output a set of bits based at least in part on performing the combinatorial multiplication of each bit of the second address of the second address space with the respective bit of the column of the matrix, and the second circuit being configured to output the bit of the first address of the first address space is based at least in part on the second circuit being further configured to perform a combinatorial sum on the set of bits.

28. An apparatus, comprising:

a first circuit configured to select, based at least in part on a power up condition of the apparatus, a seed value comprising a first quantity of bits;

a second circuit configured to select a matrix from a set of bijective matrices based at least in part on the seed value, the matrix comprising a set of columns, each column of the set of columns comprising elements associated with a set of rows, wherein a column or a row of at least one of the set of bijective matrices as at least two non-zero elements, wherein the second circuit is further configured to select a second matrix, the second matrix being an inverse of the matrix;

a third circuit configured to generate a first address of a first address space based at least in part on applying each column of the set of columns to at least a portion of a second address of a second address space, wherein each of the first address and the second address are associated with a second quantity of bits, and wherein the first quantity is greater than the second quantity; and a fourth circuit configured to access a memory array of the apparatus based at least in part on the first address, wherein the third circuit is further configured to, based at least in part on the fourth circuit accessing the memory array based at least in part on a third address of the first address space, determine a fourth address of the second address space based at least in part on a matrix multiplication of the third address of the first address space with the second matrix.

29. The apparatus of claim 25, wherein, to select the matrix, the second circuit is further configured to:

select a primitive element based at least in part on the seed value; and generate the matrix based at least in part on the primitive element and a constant associated with the seed value.

30. The apparatus of claim 25, wherein the apparatus is configured to:

receive a command that indicates the second address for accessing the memory array; and determine a third address of a third address space based at least in part on the first address, wherein the third address space comprises a physical address space.

* * * * *